United States Patent Office 2,734,849
Patented Feb. 14, 1956

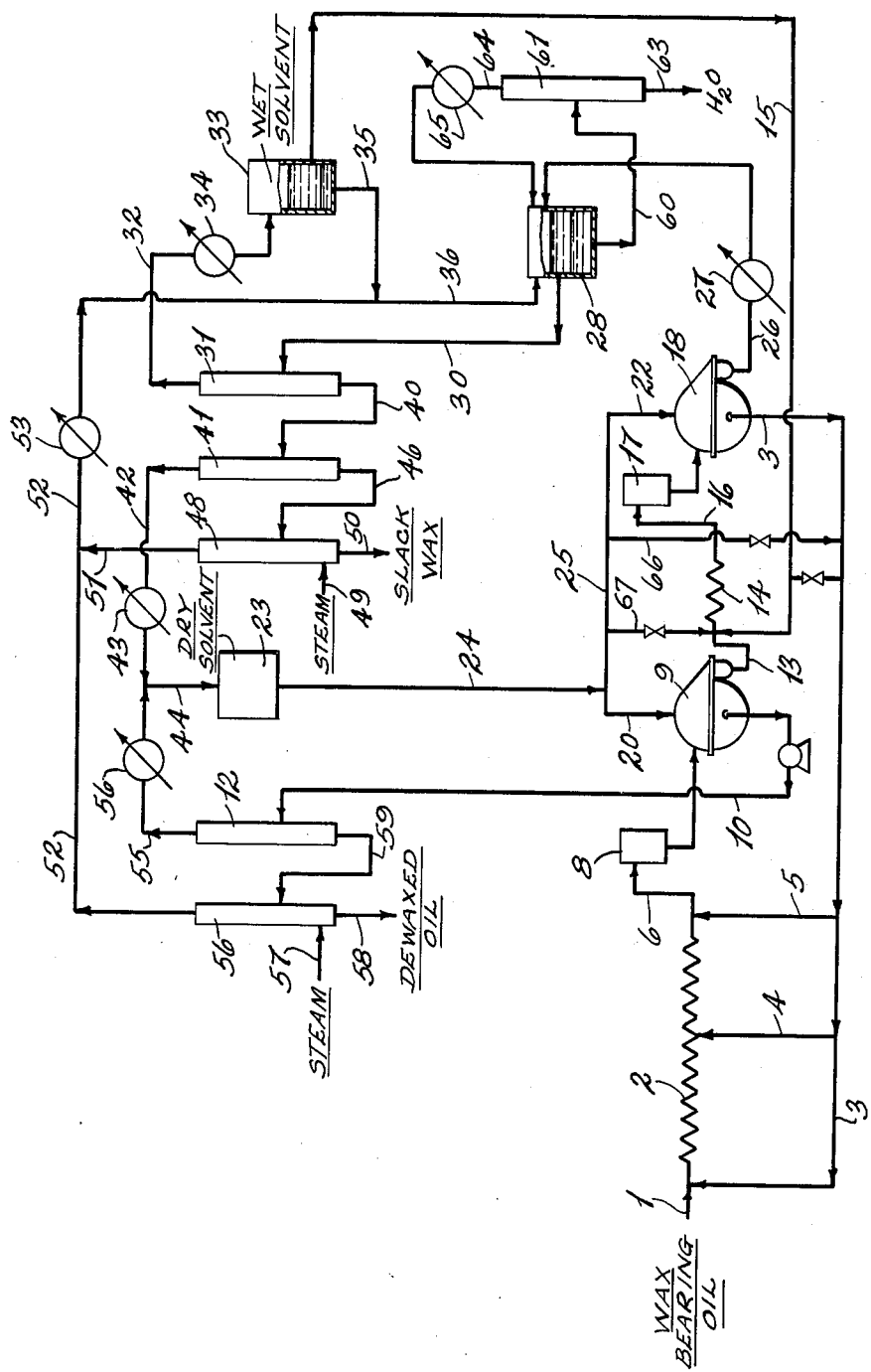

2,734,849

SOLVENT DEWAXING OF PETROLEUM OILS

Howard H. Gross, Pleasantville, and Wynkoop Kiersted, Jr., Scarsdale, N. Y., assignors to Texaco Development Corporation, New York, N. Y., a corporation of Delaware Application March 23, 1953, Serial No. 344,024

6 Claims. (Cl. 196—19)

The present invention relates to the production of substantially oil-free wax and dewaxed oil from wax-bearing lubricating oil stock by continuous filtration in the presence of a dewaxing solvent.

In greater detail, the present invention has specific application to the separation of wax from a wax-bearing lubricating oil stock followed by repulping, and secondary separation of the wax at temperatures of about 0–10° F. and below in the presence of a dewaxing solvent liquid which exerts substantially complete solvent action upon the oil but substantially no solvent action upon wax constituents of the mixture at separation temperatures, and in which solvent liquid water is at least partially miscible. As indicated, both separations are effected at temperatures below the freezing point of water from the solvent mixture such that water, if present, freezes to form ice crystals which separate with the wax.

The used solvent is recovered from the separated products, i .e., the dewaxed oil and the cake wax, and returned to the system. The bulk of the volvent is recoverable from the product fractions as a dry or substantially water free distillate by flashing or evaporation. However, complete solvent recovery is not conveniently effected in this manner, and, therefore, the distillation residue is subjected to steam stripping to recover the last 2–5% of solvent associated with the product fractions. As a result, the residual solvent is recovered in the form of a wet distillate containing a characteristically small amount of water miscible with the solvent at ordinary temperatures, and referred to herein as wet solvent.

In general, the term "dry solvent" refers to solvent containing an insignificant amount of water, not above about 0.2–0.3%; whereas a wet solvent is that containing a greater amount of water, for example, up to 1.0–2.5%.

In accordance with the present invention, the secondary wax separation or repulping step is effected in the presence of a substantial quantity of wet solvent, as previously indicated, at a temperature such that the contained moisture is crystallized and separated on the filter with the secondary wax cake. The resulting secondary filtrate, thus comprising a relatively small amount of dewaxed oil in water-free or dry solvent, is continuously cycled to dilute the wax-bearing oil feed of the primary wax separation step. The product oil and wax are continuously treated as above for solvent recovery, yielding a wet solvent stream for repulping the primary cake and a dry solvent stream which is employed in washing the separated wax of both the primary and secondary separations.

In accordance with the present invention, it has been discovered that the presence of moisture in the wet solvent seriously impairs filtration efficiency in the primary dewaxing, particularly as regards washing of the filter cake, in situ. For example, a wax distillate dewaxed on a rotary drum vacuum filter at −15° F. with 3 volumes of dry methylethyl-ketone and benzol, and washed on the filter with additional solvent, yields 65 parts of dewaxed oil and 35 parts of wax, the wax containing approximately 10% of oil, by volume.

When, however, the operation is repeated with a solvent containing about 1.5% of water, the filtrate comprises 63 parts of oil by volume and the wax contains about 15.0% of oil. Also, the filtration rate is materially less, reflecting a material loss in production efficiency.

In the repulping and separation of the primary wax cake, this consideration does not apply, presumably due to the relatively small amounts of oil contained in the solvent during the secondary separation. Therefore, the present invention provides for a substantial increase in production of dewaxed oil and product slack wax by carrying out the secondary or repulped wax separation in the presence of the wet solvent at temperatures at which the bulk of the contained water is converted to ice crystals and separated with the secondary wax, the resulting dry filtrate being cycled as diluent to the primary or dewaxing step. The invention is also of particular advantage from the standpoint that it continuously consumes without special drying treatment that portion of the recovered solvent which contains a substantial amount of moisture as the result of steam distillation in the recovery steps. Accordingly, additional and uneconomical solvent recovery steps are avoided.

In order to describe the invention in more detail, reference will now be made to the accompanying drawing comprising a flow diagram of the process.

A wax-bearing lubricating oil stock is drawn from a source, not shown, through pipe 1 to a chilling coil 2 of conventional design. Solvent liquid, for example a dry, oil containing solvent mixture of about 45% methyl-ethyl-ketone and 55% benzol, is conducted through pipe 3 and injected into the wax-bearing oil stream flowing through the chiller. The solvent may be mixed with the oil in, for example, the proportion of about 3–4 volumes of solvent per volume of oil. The entire amount may be mixed with the oil prior to introduction to the chiller or, advantageously, may be added at one or more points during flow through the chilling system as provided for by branch pipes 4 and 5.

The chilled mixture at a temperature of about −15° F. is introduced through pipe 6 and feed tank 8 to a continuous rotary vacuum drum filter 9 of conventional design. Filtration is therefore effected, for example, at about −15° F. Filtration temperatures may vary from about +10 to −60° F., depending upon the feed stock, the solvent, and the desired pour point of the dewaxed oil.

The resulting filtrate, comprising dewaxed oil of about 0 to −15° F. or lower pour test, is distributed through pipe 10 to evaporating column or flash tower 12 of a solvent recovery system to be hereinafter described in greater detail.

The wax cake discharged from the filter 10 is conducted through pipe 13 to a secondary chilling coil 14. Prior to entering the chiller 14, wet solvent is conducted through pipe 15 and injected into the wax, forming a repulped slurry. The wet solvent is added in the proportion of about 2 volumes of solvent per volume of wax contained in a wax cake. Chiller 14 again adjusts the temperature, for example, to about −15° F. and the chilled slurry passes through pipe 16 and feed tank 17 into the secondary rotary vacuum drum filter 18. The secondary filtration is conducted, for example, at about −15° F. The filtrate, comprising a relatively small concentration of dewaxed oil from the primary wax cake dissolved in the solvent liquid, passes into pipe 3 supplying dry solvent to the primary dewaxing step, as previously mentioned.

It is to be particularly noted that the filtrate flows from filter 18 at a temperature at which the bulk of the originally contained moisture is converted into solid ice crystals which are retained by the secondary filter cake. Therefore, the filtrate supplied to the primary dewaxing separation via line 3 is dry solvent, substantially free from moisture.

Both the primary and secondary filter cakes formed on filters 9 and 18 respectively are preferably washed with dry solvent supplied via pipes 20 and 22 respectively. The dry wash solvent supplied from the dry solvent accumulator 23 is to be hereinafter more fully described. The dry solvent from accumulator 23 passes to wash pipes 20 and 22 via pipe 24 and header 25.

The slack wax cake discharged from filter 18 is conducted through pipe 26 and heater 27 to a wax mix surge tank 28. In the tank 28 the mix is maintained at a temperature, for example, of about 130° F. or sufficiently high to effect complete solution of the wax in the solvent.

Since water, formed by melting of the ice crystals in the secondary wax cake, is also present, provision is made for liquid phase separation. Thus a lower layer of water containing some dissolved solvent accumulates in the bottom of the tank 28 while an upper layer of waxy hydrocarbon containing dissolved solvent collects in the upper portion of the tank.

The hydrocarbon-solvent layer is drawn off through pipe 30 to primary flash evaporator 31 wherein solvent containing the bulk of the water vapor is evaporated, forming a wet distillate which is conducted through pipe 32 to wet solvent accumulator tank 33. By means of condenser 34, the wet solvent accumulator is maintained at about ambient temperature.

Provision is herein made for phase separation into an upper layer of wet solvent and a lower layer of water containing a small amount of solvent dissolved therein. The lower water layer is continuously drawn off into slack wax surge tank 28 via pipes 35 and 36. The upper or wet solvent layer saturated with moisture at ambient temperature is drawn off through pipe 15, which, as previously mentioned, supplies wet solvent to the secondary or wax repulping operation.

The residue from flash tower 31 comprising waxy hydrocarbons and solvent substantially free of water is withdrawn from the bottom of flash tower 31 through pipe 40 into secondary flash tower 41 from which further solvent distillate is drawn off through pipe 42, condenser 43, and branch pipe 44 to the dry solvent accumulator drum 23 previously referred to.

Residual liquid from the bottom of column 41 is drawn off through pipe 46 to steam stripper 48 where the small remaining amount of solvent is distilled from the wax in the presence of steam introduced at 49. Solvent-free slack wax is discharged through pipe 50 while wet distillate is removed overhead through pipe 51, pipe 52, condenser 53 and pipe 36, previously mentioned, which communicates with the wax accumulator drum 28 in which separation of the condensed phases takes place.

As previously indicated, similar provision is made for recovering solvent from the primary dewaxed oil filtrate delivered from line 10 to flash tower 12. Dry solvent distillate is withdrawn from the top of the flash tower 12 through line 55, condenser 56 and branch pipe 44 to dry solvent accumulator 23.

The residual liquid from the bottom of column 12 is drawn off through pipe 59 to stripper 56 where the remaining solvent is distilled from the dewaxed oil in the presence of steam injected at 57. Solvent free, dewaxed oil accordingly is withdrawn as product through pipe 58 whereas the wet distillate is removed overhead through pipe 52 previously mentioned. Accordingly, the several wet stripping distillates are returned via pipes 52 and 36 to wax-solvent accumulator drum 28.

Provision is therefore made to continuously separate excess water from the system. To this end, the bottom water layer containing a small amount of solvent, which continuously forms in wax solvent surge tank 28 is withdrawn through pipe 60 into solvent fractionator 61. The water layer flowing through pipe 60 may comprise about 90% water and 10% solvent.

The purpose of the fractionator 61 is to concentrate the solvent and eliminate excess water which is discharged from the system through pipe 63. The distillate, which may comprise, for example, about 85–90% solvent is conducted through pipe 64 and condenser 65 back to the wet solvent surge drum 28. In this way, excess water is removed from the system whereas wet solvent is continuously recovered.

The solvent recovery system accordingly segregates the recovered solvent as dry and wet solvent fractions, respectively, the wet solvent fraction going to the secondary or repulping stage.

Provision is made for diverting excess dry solvent from the solvent recovery system to the secondary separation step via valved branch pipe 67 and also into admixture with the wax-bearing feed oil via valved pipe 66 extending from dry solvent header 25 into line 3. Usually the production of dry solvent is in excess and this excess therefore is consumed as indicated.

In accordance with one example of the present invention, a wax distillate oil having a viscosity of 40 SSU at 210° F. is solvent dewaxed at −10° F. and the recovered wax is solvent repulped at the same temperature.

The repulping is effected with wet solvent comprising 55 parts of methylethyl ketone and 45 parts of toluene and containing about 1.0% of water. The wet solvent is added to the wax cake produced by the primary or dewaxing separation, in the ratio of two volumes of solvent for each volume of wax contained in the wax cake. The repulped mixture is filtered, producing a secondary or repulped wax cake which is washed at −10° F. on the filter with three volumes of dry solvent.

The total filtrate comprising dry solvent and dissolved oil is continuously mixed with the fresh waxy distillate oil entering the dewaxing step in the ratio of 2.2 volumes of solvent to each volume of feed oil. The dilute mixture is dewaxed by chilling to −10° F. and filtering, then the resultant wax cake is washed on the filter with 0.7 volume of dry solvent per volume of feed oil, all at −10° F.

By these steps the yield of dewaxed oil amounts to 52% of the entering feed, whereas when wet solvent is added to the fresh feed oil in place of the secondary filtrate, the rest of the process remaining unchanged, the yield of dewaxed oil is only 50% on the basis of the oil fed to the process.

As above indicated, the present process is particularly adapted to the use of a solvent liquid mixture of a ketone antisolvent and an aromatic hydrocarbon oil solvent where the ketone water azeotrope formed in the stripping step is lower boiling than the aromatic hydrocarbon. Typical ketone wax antisolvent liquids with which water is slightly miscible under the conditions of use comprise acetone, methylethyl ketone, methylisobutyl ketone, methyl normal butyl ketone, and methyl normal propyl ketone. These are mentioned by way of example and without intending to exclude other solvents which may be used, such as other ketones, aldehydes, the chlorinated hydrocarbons, such as methylene chloride, esters, such as propyl and amyl acetate, the low boiling, normally liquid, paraffins, such as pentane and hexane, etc. Among the aromatic hydrocarbon oil solvents contemplated are benzene, toluene, etc. Also, instead of employing a mixture of solvents as described, a single solvent may be used.

It is contemplated dewaxing with solvent in the ratio of about 1–4 volumes of solvent per volume of oil. The separated wax is usually washed with from about 0.5–2.0 volumes of solvent per volume of charge oil, and repulping is usually effected with 1–5 volumes of solvent per volume of wax in the wax cake.

Secondary separation temperatures of from +10 to −60° F. are contemplated.

Obviously, many modifications and variations of the invention as herein set forth may be made without departing from the original spirit and scope thereof, and only such limitations should be imposed as are indicated in the appended claims.

We claim:

1. In the production of substantially oil-free wax and dewaxed oil from wax-bearing lubricating oil stock with a dewaxing solvent liquid which exerts a substantially complete solvent action upon oil but substantially no solvent action upon wax constituents of the mixture at separation temperatures of 10° F. and below and in which water is at least partially miscible, and wherein a mixture of said wax-bearing lubricating oil and solvent are chilled to wax separation temperature and subjected to primary wax separation to produce dewaxed oil dissolved in solvent and also primary wax containing some solvent and a small amount of oil, and said primary wax is diluted by admixture with a further quantity of solvent and subjected to a secondary separation to produce a secondary filtrate comprising solvent containing additional dewaxed oil and a secondary wax of low oil content, the improvement which comprises effecting the dilution of said primary wax with a wet solvent, carrying out the secondary separation at a temperature such that water contained in said wet solvent freezes to form solid ice crystals which are separated with the secondary wax thereby yielding a secondary filtrate comprising dry solvent, and introducing said secondary filtrate as dewaxing solvent liquid with said wax bearing lubricating oil such that said primary dewaxing is effected in the presence of a dry solvent.

2. In the production of substantially oil-free wax and dewaxed oil from wax-bearing lubricating oil stock with a dewaxing solvent liquid which exerts a substantially complete solvent action upon oil but substantially no solvent action upon wax constituents of the mixture at separation temperatures of 10° F. and below and in which water is at least partially miscible, and wherein a mixture of said wax-bearing lubricating oil and solvent are chilled to wax separation temperature and subjected to primary wax separation to produce dewaxed oil dissolved in solvent and also primary wax containing some solvent and a small amount of oil and said primary wax is admixed with a further quantity of solvent and subjected to a secondary separation to produce a secondary filtrate comprising solvent containing additional dewaxed oil and a secondary wax of low oil content, the improvement which comprises effecting said secondary wax separation in the presence of a wet solvent, conducting said secondary separation at a temperature at which the water in the solvent is substantially completely converted to solid ice crystals which separate with the secondary wax and effecting said primary separation in the presence of dry solvent comprising the filtrate from said secondary separation step.

3. In the production of substantially oil-free wax and dewaxed oil from wax-bearing lubricating oil stock with a dewaxing solvent liquid which exerts a substantially complete solvent action upon oil but substantially no solvent action upon wax constituents of the mixture at dewaxing temperatures of 10° F. and below and in which water is at least partially miscible, and wherein said wax-bearing lubricating oil and solvent are chilled to wax separation temperature and subjected to primary wax separation to produce dewaxed oil dissolved in solvent and also primary wax containing some solvent and a small amount of oil and said primary wax is admixed with a further quantity of solvent and subjected to a secondary separation to produce a secondary filtrate comprising solvent containing additional dewaxed oil and a secondary wax of low oil content, the improvement which comprises effecting said secondary separation in the presence of wet solvent and at a temperature such that the bulk of the moisture contained in said solvent is crystallized and separated with the secondary wax yielding a secondary filtrate containing dry solvent substantially free of water, and effecting said primary wax separation in the presence of dry solvent including said secondary solvent.

4. The method according to claim 3 wherein the product wax and oil are separated from associated solvent by steps yielding a dry distillate and a wet distillate, condensing said distillates to recover respectively a dry solvent and wet solvent, admixing said wet solvent with primary wax as aforesaid and washing separated wax with said dry solvent.

5. In the production of substantially oil-free wax and dewaxed oil from wax-bearing lubricating oil stock with a dewaxing solvent liquid which exerts a substantially complete solvent action upon oil but substantially no solvent action upon wax constituents of the mixture at dewaxing temperatures and in which water is partially miscible, and wherein said wax-bearing lubricating oil is subjected to primary separation in the presence of said solvent to produce dewaxed oil dissolved in solvent and primary wax containing some solvent and oil and said primary wax is mixed with a further quantity of solvent and subjected to secondary separation to produce secondary wax of low oil content and a secondary filtrate comprising solvent and a relatively small amount of dissolved oil, the improvement which comprises effecting said secondary separation in the presence of wet solvent, maintaining a secondary separation temperature such that moisture contained in the solvent is crystallized and separated with the wax, yielding a dry secondary filtrate and continuously effecting said primary separation in the presence of dry solvent comprising said dry secondary filtrate.

6. In the production of substantially oil-free wax and dewaxed oil from wax-bearing lubricating oil stock with a dewaxing solvent liquid which exerts a substantially complete solvent action upon oil but substantially no solvent action upon wax constituents of the mixture at dewaxing temperatures and in which water is partially miscible and wherein said wax-bearing lubricating oil is subjected to primary separation in the presence of said solvent to produce dewaxed oil dissolved in solvent and a primary wax containing some solvent and oil and said primary wax is mixed with a further quantity of solvent and subjected to secondary oil separation to produce secondary wax of low oil content and a secondary solvent containing a relatively small amount of dissolved oil, the improvement which comprises recovering solvent from product oil and wax by steps yielding respectively a dry solvent fraction and a wet solvent fraction, supplying said wet solvent fraction as solvent to said secondary separation step, effecting said secondary separation at a temperature such that moisture contained in the wet solvent is crystallized and separated as ice with the secondary wax, withdrawing from said secondary step filtrate comprising dry solvent containing oil and effecting said primary dewaxing separation in the presence of dry solvent including said last named stream.

References Cited in the file of this patent

UNITED STATES PATENTS

| | | |
|---|---|---|
| 2,544,307 | Fourrier et al. | Mar. 6, 1951 |
| 2,550,058 | Gee | Apr. 24, 1951 |
| 2,584,966 | Reeves | Feb. 5, 1952 |